(12) United States Patent
Nordström

(10) Patent No.: US 6,425,608 B1
(45) Date of Patent: Jul. 30, 2002

(54) JOINT AT VENTILLATING DUCTS

(76) Inventor: Lars-Ingvar Nordström, Dalbyvägen 27, Lund 22460 (SE)

( * ) Notice: Subject to any disclaimer, the term of this patent is extended or adjusted under 35 U.S.C. 154(b) by 0 days.

(21) Appl. No.: 09/717,837

(22) Filed: Nov. 21, 2000

(51) Int. Cl.⁷ ................................................ F16L 21/08
(52) U.S. Cl. ...................... 285/374; 285/331; 285/260
(58) Field of Search ................. 285/260, 331, 285/374

(56) References Cited

U.S. PATENT DOCUMENTS

| | | | | |
|---|---|---|---|---|
| 2,759,692 A | * | 8/1956 | Bohl | 285/260 |
| 3,114,567 A | * | 12/1963 | Colley | 285/260 |
| 3,379,458 A | * | 4/1968 | Frost | 285/260 |
| 3,724,878 A | | 4/1973 | Ford | |
| 3,955,834 A | | 5/1976 | Ahlrot | |
| 4,015,961 A | * | 4/1977 | Howard | 285/260 |
| 4,275,909 A | | 6/1981 | Yoshizawa et al. | |

FOREIGN PATENT DOCUMENTS

| | | | | |
|---|---|---|---|---|
| BE | 675155 | * | 2/1966 | 285/260 |
| DE | 704629 | * | 4/1941 | 285/260 |
| DE | 870 684 | | 3/1953 | |
| EP | 0 870 961 | | 10/1998 | |
| GB | 2027148 | * | 2/1980 | 285/260 |
| GB | 2061437 | * | 5/1981 | 285/260 |
| SU | 192568 | * | 2/1967 | 285/260 |
| SU | 393530 | * | 8/1973 | 285/260 |
| SU | 989225 | * | 1/1983 | 285/260 |

* cited by examiner

Primary Examiner—Eric K. Nicholson
(74) Attorney, Agent, or Firm—Merchant & Gould, P.C.

(57) ABSTRACT

A joint between the ends of two flexible ventilating ducts (10A, 10B), an end (11) of one of the ducts (10A) having a stiffening ring (13) and being telescoped over the other duct (10B), and an outer capping (14) connected to the other duct (10B) enclosing the joint between the telescoped ducts.

21 Claims, 1 Drawing Sheet

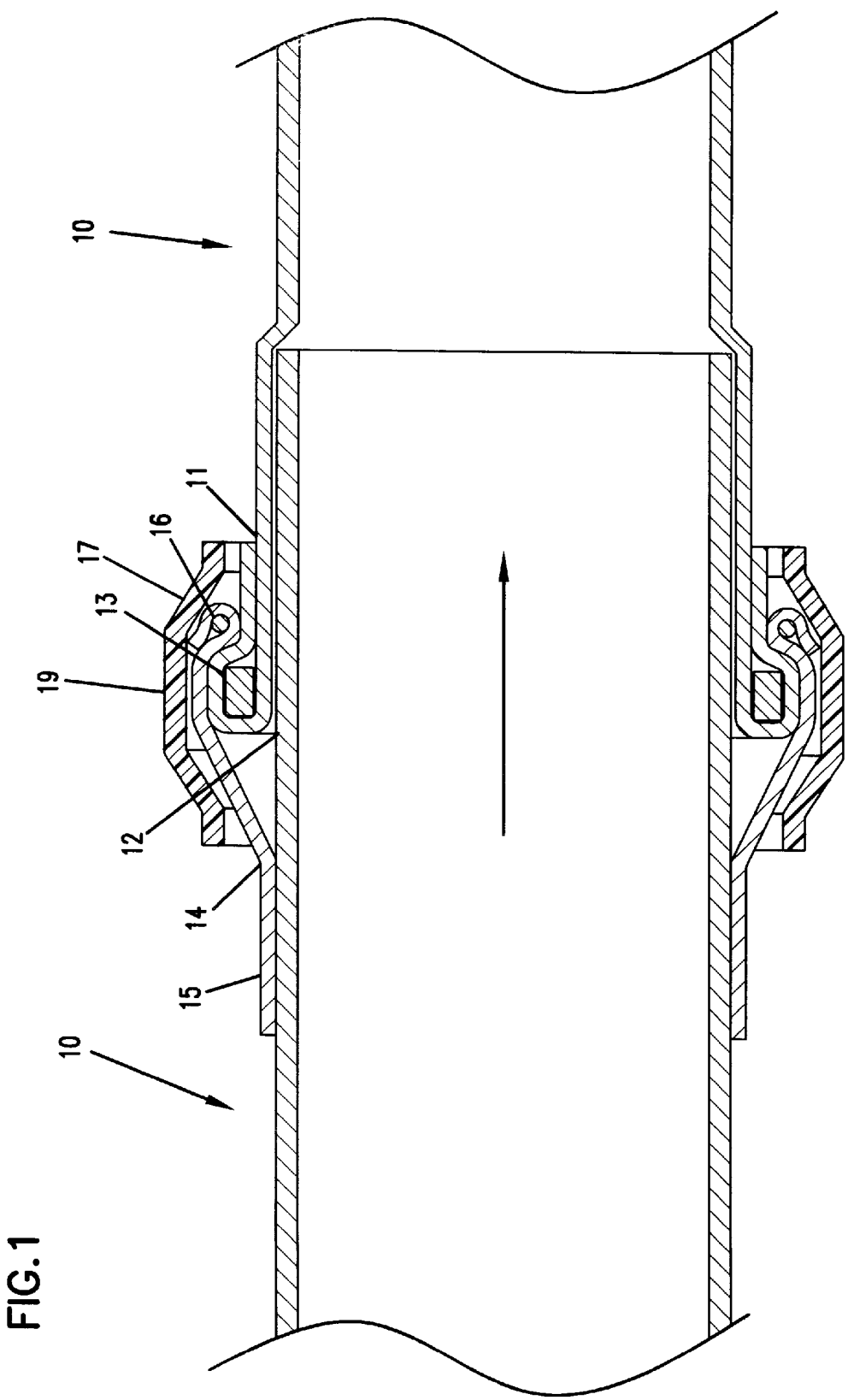

JOINT AT VENTILLATING DUCTS

TECHNICAL FIELD

The invention relates to a joint between the ends of two flexible ventilating ducts, of which an end of one of the ducts has a stiffening ring and is telescoped over the other duct, an outer capping connected to said other tube enclosing the joint between the telescoped ducts.

PRIOR ART

When drilling tunnels, fans are used which through a system of flexible ducts or pipes blow fresh air into the interior of the tunnel and likewise blow air out of the tunnel. As the drilling gradually advances and the tunnel becomes longer, new ducts or pipe sections must be connected to each other.

When connecting the ducts, it is presently common to use a system, in which the ducts are provided at one end with a stiff ring of steel. The ring of steel has the same outer diameter as the duct and is placed at the outlet end of the duct. When connecting two duct sections, the new duct is brought a certain distance past the ring of steel at its outside, after which a clamping ring is provided and tightened over the ring of steel according to the principle of a hose clamp. However, this system often has the drawback of being time consuming and difficult when forcing the new duct over the ring of steel. Furthermore, there is a certain air leakage at the clamping ring, and the position of the joint is not fixed. Moreover, the stiff ring takes up a lot of space during transport.

Another way of connecting ducts is by means of zippers, zipper holes being provided at the ends of the ducts. When connecting two ducts, co-operating ends of the ducts are connected and the zipper is connected in a usual way by means of a runner. Generally, the zipper halves are sewed onto the duct resulting in the seam forming a source of air leakage. In order to reduce the air leakage at the joint, sealing tabs are often provided internally and externally of the duct. The drawback of this connecting system is that it is not completely sealed, and especially when reversing the air flow, possible sealing tabs are blown backwards exposing the joint and creating an air leakage so big that reversing of the airflow is not possible due to leaking explosion gases. Furthermore, when connecting ducts by means of zippers, it is neither possible to adjust the ventilating ducts vertically and laterally nor to make elbows on the duct. Moreover, connection of ducts by using zippers of different fabrications is not possible due to different types and different positions for the zipper halves.

Generally, the material for the duct or pipe is a polymer material, for example a PVC-coated polyamide or polyester fabric, which is sufficiently elastic when being forced over said ring of steel. The drawback of this elasticity is that it also gives rise to an expansion of the duct material due to the air pressure formed in the duct during use, leading to a creation of obstacles for the air flow by the formation of waists at the joints, for rings of steel as well as zippers. As a result, whirls are created and the flow is reduced. As compensation, the fan capacity has to be increased with higher energy costs as a result.

SUMMARY OF THE INVENTION

The object of the invention is to accomplish a joint when connecting two flexible ventilating ducts by which a straight and undisturbed air flow is achieved. The object of the invention is also to produce a joint by which the above-mentioned drawbacks are eliminated.

According to the invention this object is achieved by a joint between the ends of two flexible ventilating ducts, of which an end of one of the ducts has a stiffening ring and is telescoped over the other duct. The joint also has an outer capping connected to the other duct enclosing the joint between the telescoped ducts. The outer capping is externally attached to the other duct inside its end and extends axially from the attachment point over said one duct. An outer clamping ring, which encloses the ducts in the area of the stiffening ring, at an edge bulge of the capping is kept in sealing engagement against said one duct inside the stiffening ring.

Other advantageous detail designs of the joint are disclosed herein.

The capping is provided with a surrounding edge bulge and is here kept pressed against said one duct. A flexible cord or cable may be provided in the bulge. Preferably, the cord is made of a plaited or laid synthetic fibre material or a plaited cotton rope. The cable is preferably made of metal.

At the area of the stiffening ring said one duct has an inner diameter, which is somewhat larger than the outer diameter of said other duct. The capping has an inner diameter, which is somewhat larger than the outer diameter of said other duct but somewhat smaller than the outer diameter in the area of the stiffening ring.

An end portion of said one duct diverges slightly outwards, and an end portion of said one duct is folded over the stiffening ring and is internally or externally welded to the duct.

Preferably, the duct material is a PVC-coated knitted polyester reinforcement having insignificant or low elasticity. The capping is on the other hand preferably made of a PVC-coated polyamide or polyester fabric having a larger elasticity than that of the duct material.

Owing to the joint according to the invention, a connection of two flexible ventilating ducts is accomplished, by which a straight and undisturbed flow of air is achieved. The joint does not constitute any hindrance for the airflow, and therefore a lower fan capacity can be used resulting in lower energy consumption. Moreover, a completely sealed joining of ducts w with essentially non-existent air leakage is achieved. Two kinds of sealings are achieved with the invention. The first sealing is achieved by the bulge bearing on the stiffening ring when it is pressed together with the clamping ring, and the other sealing is achieved by the other duct bearing on the joint as the air flow presses it against the inside of the joint.

The ventilating ducts at the joint according to the invention are adjustable vertically and laterally and also have a firmly fixed joining position. Moreover, the flexible ducts with their flexible stiffening rings are very easy to install and advantageous during transports.

SHORT DESCRIPTION OF THE DRAWING

The invention will be described in more detail in the following by way of one embodiment with reference to the accompanying drawing, which shows the duct ends of a ventilating duct according to the invention in section.

DETAILED DESCRIPTION OF THE INVENTION

In the drawing the e end portions of two similar flexible ventilating ducts 10A, 10B are shown in section, with the end 11 of the duct 10A, which in the air flow direction according to the arrow constitutes an inlet end, and the end 12 of the duct 10B, which constitutes an outlet end, facing each other.

The ventilating ducts 10A, 10B tare made of a flexible reinforced polymer material, preferably of a PVC-coated polyester fabric. In contrast to the conventionally used fabrics in the art, whose threads generally are woven or plaited together separately, the polyester reinforcement in the ducts 10A, 10B should be of a knitted type with multiple threads put on top of each other in two layers and fixed with a knitting thread. This method of manufacture produces a reinforcement fabric that is considerably less stretchable than common fabrics. Yet, this material stretches somewhat at the beginning when air flows through the duct, but this stretching is considerably less than that for earlier used fabrics. To compensate for the inevitable stretching of the material, the first end portion 11 is according to the invention designed so that it diverges somewhat at its outermost end.

A rigid or flexible stiffening ring 13, preferably made of steel or plastic, whose inner diameter is somewhat larger than the outer diameter of the ducts 10A, 10B, is attached to the end portion 11. This is accomplished in that the end portion 11 is folded over the stiffening ring 13 and externally welded to the duct. A capping 14 is provided inside the end 12, the capping having an inner diameter larger than the outer diameter of the duct 10A, 10B but smaller than the outer diameter of the stiffening ring 13. The capping 14 is made of a material having a larger elasticity than that of the duct material. Preferably, the capping 14 is attached at its end 15, which is turned away from the end 12, externally on the duct by way of plastic welding. Furthermore, a surrounding edge bulge 16 is provided at the second end 17 of the capping 14, i e at the end facing towards the end 12, in that the end portion of the capping is folded and welded to the capping 14. A supple flexible cord or cable is provided in the bulge 16, wherein the cord can be made of a plaited or laid synthetic fibre material or a plaited cotton rope, and the cable can be made of a flexible metal.

When joining the two ducts 10A, 10B, which at one end 11 are designed as the duct 10A and at the other end 12 are designed as the duct 10B, the duct 10A is telescoped over. the other duct 10B. Then, the end 17 with the bulge 16 of the capping 14 is forced over the area of the stiffening ring 13, so that the capping encloses the telescoped ducts 10A, 10B. The inner diameter of the capping 14 at the end 17 is somewhat smaller than the outer diameter at the stiffening ring 13 but owing to the fact that the material of the capping can yield, i e has a certain elasticity, the capping 14 and the bulge 16 are easily forced over the stiffening-ring 13, so that the capping lies evenly over the stiffening ring. It is very important that no creases are created on the capping 14 at the stiffening 13 since these give rise to air leakage at the joint. The bulge 16 defines a fixed position for the joint, after which an outer clamping ring 19 is tightened at the area over the stiffening ring 13, so that the capping 14 is kept pressed against the duct 10A. The clamping ring 19 can be equipped with a centre groove (not shown) or have a design that encloses the stiffening ring 13 and the bulge 16. Another great advantage with this arrangement is that the bulge 16 forms a sealing element in the form of a gasket in sealing engagement with the welded stiffening ring 13 and is pressed against said stiffening ring by way of the outer clamping ring 19.

Further, since the capping 14 is provided at a certain distance inside the end 12, the end portion of the duct 10B forms an additional sealing of the joint. The air pressure in the duct presses the end portion at the end 12 against the inside of the joint. The higher the air pressure is, the better the sealing will be.

When air flows through the ventilating duct, the ducts 10A, 10B are stretched so much that their outer diameters nearly will correspond to the inner diameter at the stiffening ring 13 by the end 11. Hereby, a joint without a waist is achieved, at which the ventilating ducts 10A, 10B are straight not disturbing the flow process of the air and not requiring a bigger fan capacity as compensation.

Another advantage of the ventilating duct according to the invention is that it can be used when reversing the airflow, i e when the stream of air is directed in an opposite direction, e g after an explosion when the air in the tunnel must be cleaned from explosion gases, particles and dust. When reversing the airflow, the end 12 is blown back past the joint and is stopped at the welding of the capping 14. This exposes the joint but owing to the effective sealing between the cable 16 and the stiffening ring 13 together with the clamping ring 19, there is no air leakage at the joint even with a reversed airflow.

With the ventilating ducts 10A, 10B according to the invention, it is also possible to create elbows on the duct and adjust it vertically or laterally by tilting the stiffening ring 13 during installation.

What is claimed is:

1. A joint between ends of two flexible ventilating ducts, one duct being telescoped over the other duct, the joint comprising:

a stiffening ring positioned at an end of the one duct, the one duct having an inner diameter adjacent an area of the stiffening ring that is larger than an outer diameter of the other duct;

a capping externally attached to the other duct inwardly of an end of the other duct and extending axially from an attachment site over the one duct to enclose the joint between the telescoped ducts;

an edge bulge on the capping, the edge bulge including a flexible cord made of synthetic fiber material; and an outer clamping ring enclosing the ducts in the area of the stiffening ring with the edge bulge in sealing engagement against the one duct inwardly of the stiffening ring.

2. A joint according to claim 1, characterized in that the capping (14) has an inner diameter that is larger than the outer diameter of said other duct (10B) but smaller than an outer diameter of the stiffening ring (13).

3. A joint according to claim 1, characterized in that an end portion of said one duct (10A) diverges slightly outwards.

4. A joint according to claim 1, characterized in that an end portion of said one duct (10A) is folded over the stiffening ring (13) and is internally welded to the duct (10A).

5. A joint according to claim 1, characterized in that the ducts are made of a PVC-coated knitted polyester reinforcement with low elasticity.

6. A joint according to claim 1, characterized in that the capping (14) is made of a material having a larger elasticity than that of the ducts.

7. A joint according to claim 1, characterized in that the capping (14) is made of a PVC-coated polyamide.

8. A joint between ends of two flexible ventilating ducts, one duct being telescoped over the other duct, the joint comprising:

a stiffening ring positioned at an end of the one duct the one duct having an inner diameter adjacent an area of the stiffening ring that is larger than an outer diameter of the other duct;

a capping externally attached to the other duct inwardly of an end of the other duct and extending axially from an attachment site over the one duct to enclose the joint between the telescoped ducts;

an edge bulge on the capping, the edge bulge including a flexible cord made of plaited cotton rope; and an outer clamping ring enclosing the ducts in the area of the stiffening ring with the edge bulge in sealing engagement against the one duct inwardly of the stiffening ring.

9. A joint according to claim 8, characterized in that the capping (14) has an inner diameter that is larger than the outer diameter of said other duct (10B) but smaller than an outer diameter of the stiffening ring (13).

10. A joint according to claim 8, characterized in that an end portion of said one duct (10A) diverges slightly outwards.

11. A joint according to claim 8, characterized in that an end portion of said one duct (10A) is folded over the stiffening ring (13) and is externally welded to the duct (10A).

12. A joint according to claim 8, characterized in that the ducts are made of a PVC-coated knitted polyester reinforcement with low elasticity.

13. A joint according to claim 8, characterized in that the capping (14) is made of a material having a larger elasticity than that of the ducts.

14. A joint according to claim 8, characterized in that the capping (14) is made of a polyester fabric.

15. A joint between ends of two flexible ventilating ducts, one duct being telescoped over the other duct, the joint comprising:

a stiffening ring positioned at an end of the one duct, an end portion of the one duct being folded over the stiffening ring and being internally and externally welded to the one duct;

a capping externally attached to the other duct inwardly of an end of the other duct and extending axially from an attachment site over the one duct to enclose the joint between the telescoped ducts;

an edge bulge on the capping; and an outer clamping ring enclosing the ducts at a position adjacent the stiffening ring with the edge bulge in sealing engagement against the one duct inwardly of the stiffening ring.

16. A joint according to claim 15, characterized in that a flexible cable is provided in the edge bulge (16).

17. A joint according to claim 16, characterized in that said cable is made of metal.

18. A joint according to claim 15, characterized in that said one duct (10A) at the area of the stiffening ring (13) has an inner diameter that is larger than an outer diameter of said other duct (10B).

19. A joint according to claim 15, characterized in that the capping (14) has an inner diameter that is larger than the outer diameter of said other duct (10B) but smaller than an outer diameter of the stiffening ring (13).

20. A joint according to claim 15, characterized in that an end portion of said one duct (10A) diverges slightly outwards.

21. A joint according to claim 15, characterized in that the capping (14) is made of a material having a larger elasticity than that of the ducts.

* * * * *